United States Patent
Takahashi

(10) Patent No.: US 7,251,360 B2
(45) Date of Patent: Jul. 31, 2007

(54) LOOK-UP TABLE GENERATION METHOD, COMPUTER PROGRAM, AND IMAGING APPARATUS

(75) Inventor: Kenji Takahashi, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 785 days.

(21) Appl. No.: 10/778,991

(22) Filed: Feb. 13, 2004

(65) Prior Publication Data

US 2004/0161147 A1    Aug. 19, 2004

(30) Foreign Application Priority Data

Feb. 14, 2003   (JP)   ............................. 2003-036624
Feb. 14, 2003   (JP)   ............................. 2003-036653

(51) Int. Cl.
    *G06K 9/00*   (2006.01)
(52) U.S. Cl. ...................................... 382/167; 382/162
(58) Field of Classification Search ................ 382/167, 382/162; 348/E9.053; 358/520; 600/117
See application file for complete search history.

(56) References Cited

U.S. PATENT DOCUMENTS 6,059,718 A * 5/2000 Taniguchi et al. .......... 600/117
6,823,083 B1 * 11/2004 Watanabe et al. ........... 382/167

FOREIGN PATENT DOCUMENTS

| JP | 411069181 A | * | 3/1999 |
| JP | 2001069533 A | * | 3/2001 |
| JP | 2001292332 A | * | 10/2001 |

* cited by examiner

*Primary Examiner*—Anh Hong Do
(74) *Attorney, Agent, or Firm*—Morgan & Finnegan, LLP

(57) ABSTRACT

Upon generating a look-up table data used to retouch and color-convert arbitrary image data imaged by an imaging apparatus, when the saturation value of source image data is equal to or smaller than a predetermined threshold value, new image data which undergoes tinting correction of achromatic colors by multiplying the saturation value of the retouched image data by a correction coefficient calculated from the saturation values of the source image data and retouched image data is generated. Then, a look-up table is generated using the source image data and the new third image data which is free from any tinting of achromatic colors. Upon generating a look-up table for color conversion, new image data which undergoes tinting correction of achromatic colors by converting grid point storage values stored at grid points representing achromatic colors of a basic look-up table into achromatic color data is generated, and a look-up table is generated using the source data and the new image data which is free from any tinting of achromatic colors.

28 Claims, 9 Drawing Sheets

LOOK-UP TABLE GENERATION METHOD, COMPUTER PROGRAM, AND IMAGING APPARATUS

CLAIM OF PRIORITY

The present application claims priority under 35 U.S.C. §119 from Japanese Patent Applications No. 2003-036624 and No. 2003-036653, both entitled "A Look-up Table Generation Method, An Imaging Apparatus and A Computer Program" and both filed on Feb. 14, 2003, the entire contents of which are hereby incorporated by reference herein.

FIELD OF THE INVENTION

The present invention relates to a look-up table generation method for a color conversion process of image data and, more particularly, to a look-up table generation method for a color conversion process of image data obtained by imaging an object.

BACKGROUND OF THE INVENTION

As a color conversion method, a method of making color conversion using a look-up table has been proposed. This color conversion method using a look-up table has received a lot of attention since it can freely design (customize) color conversion parameters (e.g., it can convert only local colors on the color space).

However, this color conversion method using a look-up table often generates grayscale discontinuity unless parameters are set after thorough consideration. Especially, in achromatic colors, discontinuity due to tinting of achromatic colors is often perceived due to the human perceptual characteristics.

Conventionally, as an invention that suppresses tinting of achromatic colors upon color conversion, an invention that evenly suppresses chromaticity levels around achromatic colors using a gain or table is known, although it is not a color conversion process using an N-dimensional look-up table. However, such invention cannot cope with subtle hue and luminance changes of achromatic colors of various luminance levels.

SUMMARY OF THE INVENTION

The present invention has been made in consideration of the aforementioned problems, and has as its object to prevent tinting of achromatic colors in an image retouch process.

For example, according to the present invention, the foregoing object is attained by a look-up table generation method for generating a look-up table used to color-convert first image data into second image data, comprising the steps of: determining whether or not a saturation value of the first image data is not more than a predetermined threshold value; calculating, if it is determined that the saturation value of the first image data is not more than the threshold value, a correction coefficient from the saturation value of the first image data and a saturation value of the second image data so that the saturation value of the second image data becomes smaller than the saturation value of the first image data; generating third image data by multiplying the saturation value of the second image data by the correction coefficient; and generating a look-up table using the first and third image data.

For example, according to the present invention, the foregoing object is attained by providing a look-up table generation method for generating a look-up table used to color-convert an arbitrary image using source image data and destination image data generated by applying a retouch process to the source image data, comprising the steps of: determining whether or not a color component signal value of the source image data is not more than a predetermined threshold value; and generating, when it is determined that the color component signal value of the source image data is not more than the threshold value, a look-up table so that a color component signal value of the destination image data becomes smaller than the color component signal value of the source image data.

Furthermore, for example, according to the present invention, the foregoing object is attained by providing a look-up table generation method for generating a look-up table used to color-convert first image data into second image data, comprising the steps of: generating a basic look-up table used to color-convert the first image data into the second image data; and correcting the basic look-up table by converting a grid point storage value stored at each grid point representing an achromatic color of the basic look-up table into achromatic color data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DETAILED DESCRIPTION OF THE PREFERRED EMBODIMENTS

First Embodiment

Figure 1:
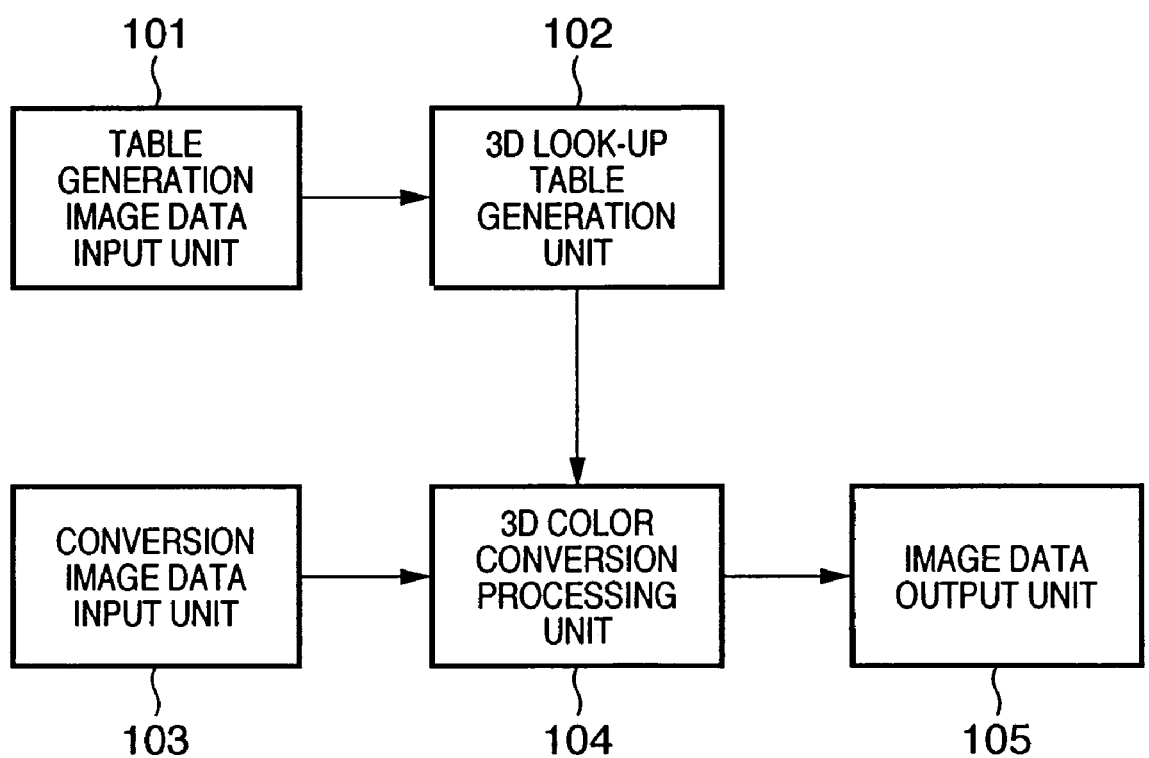
FIG. 1 is a block diagram showing a color conversion processing system according to the first embodiment.
Figure 3:
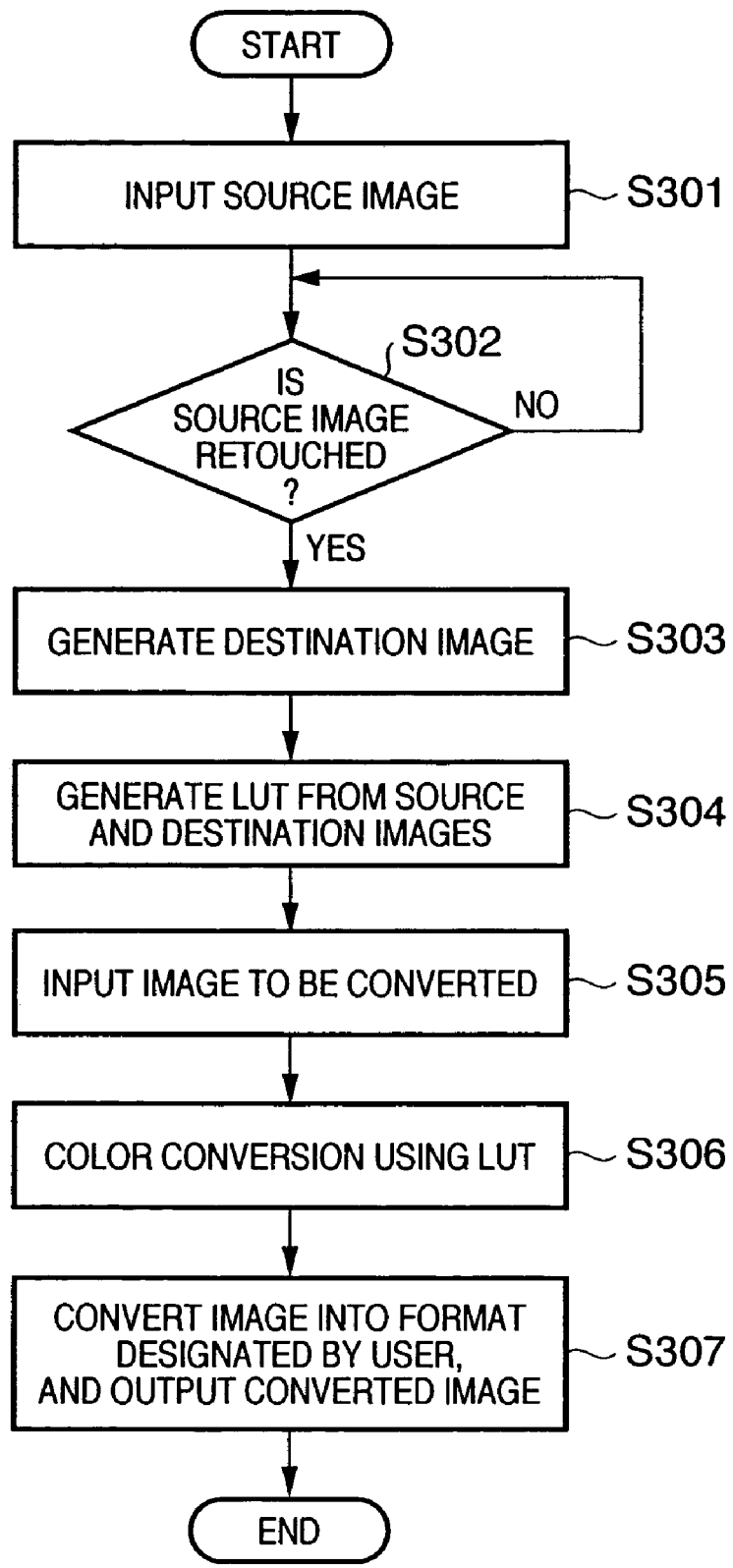
FIG. 3 is a flow chart of a color conversion table using a 3D look-up table according to the first embodiment.

FIG. 1 is a simple block diagram of a color conversion processing system that adopts an N-dimensional look-up table generation process according to the present invention. An N-dimensional look-up table generation method according to this embodiment and a color conversion process using an N-dimensional look-up table generated by that method will be described below using the block diagram of FIG. 1, and the flow chart of FIG. 3. In this embodiment, N of the N-dimensional look-up table is 3 for the sake of simplicity.

Referring to FIG. 1, a table generation image input unit 101 is a processing unit for inputting image data which is used as a basis upon generation of a three-dimensional (3D) look-up table. In step (to be defined as "S" hereinafter) 301 in FIG. 3, the user locally or entirely applies a retouch process to the colors of a source (original) image as image data that serves as a conversion source (S302). Note that the source image is imaged by an imaging apparatus, and a destination (target, objective) image is obtained by retouching the source image. As a result, a destination image is generated (S303). The source and destination images are sent to a 3D look-up table generation unit 102, which generates a 3D look-up table on the basis of the source and destination images (S304). After the 3D look-up table is generated, image data to be converted using this 3D look-up table is input to a conversion image data input unit 103 (S305). This input unit 103 reads out signal values on the basis of the format of image data and sends them to a 3D color conversion processing unit 104. The 3D color conversion processing unit 104 executes a color conversion process using the 3D look-up table generated by the 3D look-up table generation unit 102 (S306). The signal values of the image that has undergone the color conversion process undergo format conversion on the basis of an image data format designated by the user in an image data output unit 105, and the converted signal values are output (S307). The flow of the process has been briefly explained. The individual processing units will be described in more detail below.

Figure 2:
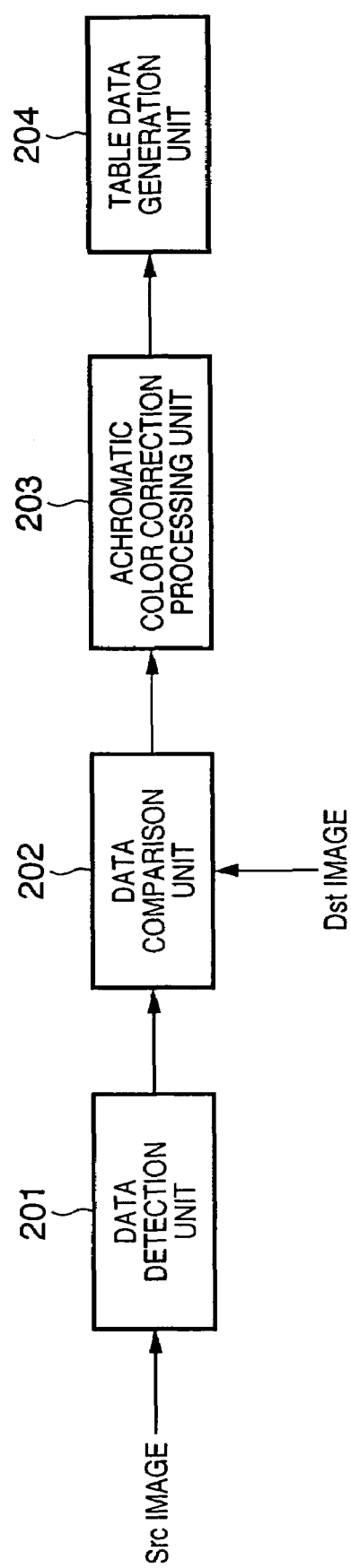
FIG. 2 is a block diagram of a three-dimensional (3D) look-up table generation unit in the first embodiment.
Figure 4:
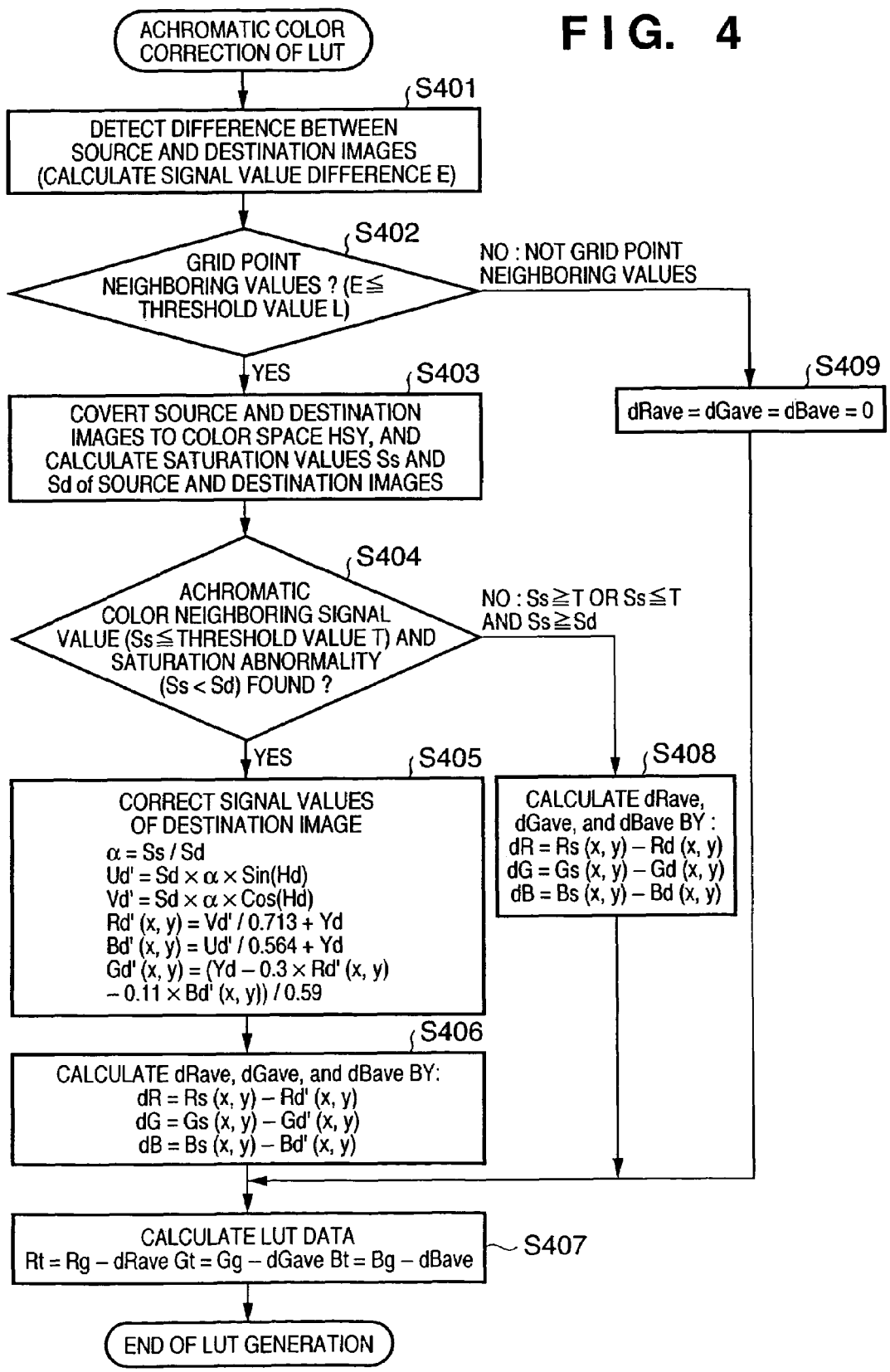
FIG. 4 is a flow chart of an achromatic color correction process of a look-up table generation unit according to modification 1 of the first embodiment.

FIG. 2 is a block diagram showing the internal arrangement of the 3D look-up table generation unit 102, and the flow of an achromatic color correction process in the look-up table generation unit will be described below using the flow chart of FIG. 4.

In this embodiment, a 3D look-up table having 729 (=9×9×9) grid points is defined by setting a grid point (signal value) interval=32 steps, and I-, J-, and K-th grid point values of the 3D look-up table in the R, G, and B directions are respectively given by:

$$Rg=32\times I \quad (1)$$

$$Gg=32\times J \quad (2)$$

$$Bg=32\times K \quad (3)$$

Also, grid point storage values corresponding to these grid point values are respectively expressed by:

$$Rt=3DTableR(I,J,K) \quad (4)$$

$$Gt=3DTableG(I,J,K) \quad (5)$$

$$Bt=3DTableB(I,J,K) \quad (6)$$

(for I=0 to 8, J=0 to 8, and K=0 to 8)

For example, if I=1, J=2, and K=3, grid point values are (32×1, 32×2, 32×3)=(32, 64, 96), and the grid point storage values are (3DTableR(1, 2, 3), 3DTableG(1, 2, 3), 3DTableB (1, 2, 3)). This means that data conversion using this 3D look-up table converts input signal values (32, 64, 96) into signal values (3DTableR(1, 2, 3), 3DTableG(1, 2, 3), 3DTableB(1, 2, 3)). When a 3D look-up table is set to obtain Rt=Rg, Gt=Gg, and Bt=Bg at all grid points, a 3D look-up table which can output the same values as input values is set.

A data detection unit 201 calculates signal values in the neighborhood of grid point values (Rg, Gg, Bg). Let (Rs(x, y), Gs(x, y), Bs(x, y)) be the signal values of a source image (where x and y are the coordinate values of an image). Then, a difference E between the grid point values and signal values is calculated (S401) by:

$$E=\sqrt{((Rg-Rs(x,y))^2+(Gg-Gs(x,y))^2+(Bg-Bs(x,y))^2)} \quad (7)$$

If the difference E of the signal values is equal to or smaller than a threshold value L, which is determined in advance, it is determined that the signal values neighbor a given grid point (S402). The value L used in this case is determined by a signal value difference which can be perceived as a different color, and it is desirable to set different values for respective colors. However, in the description of this embodiment, the same value L is used for all colors for the sake of simplicity. When a pixel which meets the condition that values in the neighborhood of a grid point, that is, the signal value difference is equal to or smaller than L (E≦L) is extracted from the source image, a data comparison unit 202 reads out signal values (Rd(x, y), Gd(x, y), Bd(x, y)) of a destination image corresponding to the coordinate position (x, y) of that pixel, and the signal values of the source and destination images are converted into signal values of hue H, saturation S, and luminance Y using the following equations (S403).

The signal values of the source images are respectively converted from R, G, and B signal values into H, S, and Y signal values by:

$$Ys=0.3\times Rs(x,y)+0.59\times Gs(x,y)+0.11\times Bs(x,y) \quad (8)$$

$$Us=(Bs(x,y)-Ys)\times 0.564 \quad (9)$$

$$Vs=(Rs(x,y)-Ys)\times 0.713 \quad (10)$$

$$Hs=\text{Tan}-1(Us/Vs) \quad (11)$$

$$Ss=\sqrt{(Us^2+Vs^2)} \quad (12)$$

Likewise, the signal values of the destination image are respectively converted from R, G, and B signal values into H, S, and Y signal values by:

$$Yd=0.3\times Rd(x,y)+0.59\times Gd(x,y)+0.11\times Bd(x,y) \quad (13)$$

$$Ud=(Bd(x,y)-Yd)\times 0.564 \quad (14)$$

$$Vd=(Rd(x,y)-Yd)\times 0.713 \quad (15)$$

$$Hd=\text{Tan}-1(Ud/Vd) \quad (16)$$

$$Sd=\sqrt{(Ud^2+Vd^2)} \quad (17)$$

Next, saturation Ss of the signal values of the source image is compared with a threshold value T, and Ss is compared with saturation Sd of the signal values of the destination image (S404). If the signal value Ss of the source image is equal to or smaller than the threshold value T (Ss≦T), Ss represents an achromatic color. If the signal value Ss is smaller than saturation Sd of the signal values of the destination image (Ss<Sd), it represents that saturation abnormality, that is, tinting of an achromatic color, has occurred. The threshold value T used in this process is determined by a saturation value perceived as an achromatic color on that color space.

Conversely, if Ss>T, it is determined that the signal is not an achromatic color. Also, if Ss≦T and Ss≦Sd, since the saturation of an achromatic color is never emphasized to cause tinting of the achromatic color, the signal values of the destination image are not corrected. Hence, dR, dG, and dB are calculated directly using the signal values Rd(x, y), Gd(x, y), and Bd(x, y) of the destination image (S408) by:

$$dR=Rs(x,y)-Rd(x,y) \quad (18)$$

$$dG=Gs(x,y)-Gd(x,y) \quad (19)$$

$$dB=Bs(x,y)-Bd(x,y) \quad (20)$$

If Ss≦T and Ss<Sd in S404, an achromatic color correction processing unit 203 obtains dR, dG, and dB by calculating corrected destination signal values Rd'(x, y), Gd'(x, y), and Bd'(x, y) (S406) by:

$$\alpha=Ss/Sd \quad (21)$$

$$Ud'=Sd\times\alpha\times\operatorname{Sin}(Hd) \quad (22)$$

$$Vd'=Sd\times\alpha\times\operatorname{Cos}(Hd) \quad (23)$$

$$Rd'(x,y)=Vd'/0.713+Yd \quad (24)$$

$$Bd'(x,y)=Ud'/0.564+Yd \quad (25)$$

$$Gd'(x,y)=(Yd-0.3\times Rd'(x,y)-0.11\times Bd'(x,y))/0.59 \quad (26)$$

$$dR=Rs(x,y)-Rd'(x,y) \quad (27)$$

$$dG=Gs(x,y)-Gd'(x,y) \quad (28)$$

$$dB=Bs(x,y)-Bd'(x,y) \quad (29)$$

Average values dRave, dGave, and dBave of dR, dG, and dB of the entire source image at the grid point values (Rg, Gg, Bg) are calculated. If the source image does not include any values in the neighborhood of a grid point (E>L), dRave=dGave=dBave=0 (S409).

The values dRave, dGave, and dBave calculated by the above method are sent to a table data generation unit 204, which calculates grid point storage values (Rt, Gt, Bt) corresponding to the grid point values (Rg, Gg, Bg) of a customized 3D look-up table (S407) by:

$$Rt=Rg-dRave \quad (30)$$

$$Gt=Gg-dGave \quad (31)$$

$$Bt=Bg-dBave \quad (32)$$

By repeating the aforementioned process for all the grid points, a 3D look-up table is generated. Practical effects in the embodiment of the present invention will be described below using actual values as an example. A case will be explained wherein both the hue and saturation of RGB values (64, 67, 68) in the source image have been changed to (64, 71, 71) in the destination image. Grid point values (Rg, Gg, Bg) closest to (64, 67, 68) are (64, 64, 64), and calculations using equations (8) to (17) yield Ss=1.87 and Sd=3.68. If the threshold value T=10 is defined, conditions Ss<T and Ss<Sd are met. Next, calculations using equations (21) to (29) yield (dR, dG, dB)=(−2.41, −2.97, −1.97), and equations (30), (31), and (32) yield (Rt, Gt, Bt)=(66, 67, 66). That is, look-up table values that convert signal values (64, 64, 64) into (66, 67, 66) are calculated. On the other hand, calculations of values without using those of the first embodiment are as follows. The differences between the signal values of the source and destination images are (dR, dG, dB)=(64−64, 67−71, 68−71)=(0, −4, −3), and equations (30), (31), and (32) yield values (Rt, Gt, Bt)=(64.4, 68, 67). The saturation of the signal values (66, 67, 66) of the table calculated in the first embodiment is 0.45, while that of the signal values (64, 68, 67), which is calculated without using the first embodiment, is 1.93. Also, when the luminance values of these signal values are calculated, they both are 67. Hence, as can be seen from these results, the hue and luminance levels can be changed while suppressing the saturation of an achromatic color.

The 3D color conversion processing unit 104 will be described below. Values I, J, and K representing an index of a grid point are calculated from RGB signal values R, G, and B of an image sent from the conversion image input unit 103 (note that digits after the decimal point of I, J, and K are dropped):

$$I=R/32 \quad (33)$$

$$J=G/32 \quad (34)$$

$$K=B/32 \quad (35)$$

Furthermore, values Rf, Gf, and Bf representing distances between the RGB signal values R, G, and B of the image and grid point values are calculated by:

$$Rf=R-I\times 32 \quad (36)$$

$$Gf=G-J\times 32 \quad (37)$$

$$Bf=B-K\times 32 \quad (38)$$

Using the above values, converted values Ro, Go, and Bo obtained by converting the RGB signal values R, G, and B of the image using the 3D look-up table and cubic interpolation calculations are calculated by:

$$\begin{aligned}Ro=&(3\mathrm{Dtable}R(I,J,K)\times(32-Rf)\times(32-Gf)\times(32-Bf)\\&+3\mathrm{Dtable}R(I+1,J,K)\times(Rf)\times(32-Gf)\times(32-Bf)\\&+3\mathrm{Dtable}R(I,J+1,K)\times(32-Rf)\times(Gf)\times(32-Bf)\\&+3\mathrm{Dtable}R(I,J,K+1)\times(32-Rf)\times(32-Gf)\times(Bf)\\&+3\mathrm{Dtable}R(I+1,\ J+1,K)\times(Rf)\times(Gf)\times(32-Bf)\\&+3\mathrm{Dtable}R(I+1,J,K+1)\times(Rf)\times(32-Gf)\times(Bf)\\&+3\mathrm{Dtable}R(I,J+1,K+1)\times(32-Rf)\times(Gf)\times(Bf)\\&+3\mathrm{Dtable}R(I+1,\ J+1,K+1)\times(Rf)\times(Gf)\times(Bf))/(32\times32\times32)\end{aligned} \quad (39)$$

$$\begin{aligned}Go=&(3\mathrm{Dtable}G(I,J,K)\times(32-Rf)\times(32-Gf)\times(32-Bf)\\&+3\mathrm{Dtable}G(I+1,J,K)\times(Rf)\times(32-Gf)\times(32-Bf)\\&+3\mathrm{Dtable}G(I,J+1,K)\times(32-Rf)\times(Gf)\times(32-Bf)\\&+3\mathrm{Dtable}G(I,J,K+1)\times(32-Rf)\times(32-Gf)\times(Bf)\\&+3\mathrm{Dtable}G(I+1,\ J+1,K)\times(Rf)\times(Gf)\times(32-Bf)\\&+3\mathrm{Dtable}G(I+1,J,K+1)\times(Rf)\times(32-Gf)\times(Bf)\\&+3\mathrm{Dtable}G(I,J+1,K+1)\times(32-Rf)\times(Gf)\times(Bf)\\&+3\mathrm{Dtable}G(I+1,\ J+1,K+1)\times(Rf)\times(Gf)\times(Bf))/(32\times32\times32)\end{aligned} \quad (40)$$

$$\begin{aligned}Bo=&(3\mathrm{Dtable}B(I,J,K)\times(32-Rf)\times(32-Gf)\times(32-Bf)\\&+3\mathrm{Dtable}B(I+1,J,K)\times(Rf)\times(32-Gf)\times(32-Bf)\\&+3\mathrm{Dtable}B(I,J+1,K)\times(32-Rf)\times(Gf)\times(32-Bf)\\&+3\mathrm{Dtable}B(I,J,K+1)\times(32-Rf)\times(32-Gf)\times(Bf)\end{aligned}$$

$$+3\mathrm{D table}B(I+1, J+1,K) \times (Rf) \times (Gf) \times (32-Bf)$$

$$+3\mathrm{D table}B(I+1,J,K+1) \times (Rf) \times (32-Gf) \times (Bf)$$

$$+3\mathrm{D table}B(I,J+1,K+1) \times (32-Rf) \times (Gf) \times (Bf)$$

$$+3\mathrm{D table}B(I+1, J+1,K+1) \times (Rf) \times (Gf) \times (Bf))/(32 \times 32 \times 32) \tag{41}$$

With the above conversion, the R, G, and B signal values of the image input to the conversion image data input unit 103 are converted into Ro, Go, and Bo for respective pixels using the 3D look-up table which is generated by the unit 102 and undergoes achromatic color correction by the unit 103, and interpolation calculations, and the converted values are sent to the image data output unit 105.

In this embodiment, R, G, and B signals are used as source image data (source image signals) and destination image data (destination image signals). However, the present invention is not limited to such specific signals, but any other signals such as YUV signals, CMY signals, CMYG signals, and the like may be used by changing the dimensions of the look-up table and the calculation method for converting into a color space including saturation. Also, a method of calculating the Gain value α in the achromatic color correction processing unit 203 is not limited to equation (21), and any other functions or look-up tables using Ss/Sd as an argument may be used. For example, α×Ss/Sd (α<1) may be set. Also, α×Ss/Sd may be calculated in advance, and may be stored in a table to make table look-up. In this embodiment, the saturation values of the signal values of the source and destination images are calculated based on U and V values after conversion to the YUV space. However, the present invention is not limited to this, and saturation values may be calculated using a* and b* after conversion to the L*a*b* space.

In this embodiment, look-up table data that convert R, G, and B signals into R, G, and B signals using Rt, Gt, and Bt calculated by equations (30, 31), and (32) are generated. Alternatively, these values Rt, Gt, and Bt may be converted into Y, U, and V signals using the following equations. When these converted values are used as 3D look-up table data, they can be used as look-up table data that convert R, G, and B signals into Y, U, and V signals. In this case, equations upon converting 3D look-up table data of R, B, and B signals into those of Y, U, and V signals are:

$$Yt=0.3 \times Rt+0.59 \times Gt+0.11 \times Bt \tag{42}$$

$$Ut=(Bt-Yt) \times 0.564 \tag{43}$$

$$Vt=(Rt-Yt) \times 0.713 \tag{44}$$

In this manner, a process for converting R, G, and B signals into Y, U, and V signal can be omitted.

Modification 1 of First Embodiment

Modification 1 of the first embodiment will be described below.

The following explanation will be given using the same block diagrams as those in the first embodiment.

In this embodiment, N of the N-dimensional look-up table is 3 for the sake of simplicity. Also, the first embodiment has explained generation of the 3D look-up table that converts R, G, and B signals into R, G, and B signals, but this embodiment will explain generation of a 3D look-up table that converts R, G, and B signals into Y, U, and V signals. A description of the same parts as those in the first embodiment will be omitted.

FIG. 2 is a block diagram showing the internal arrangement of the 3D look-up table generation unit 102. The data detection unit 201 calculates signal values in the neighborhood of grid point values (Rg, Gg, Bg). Let (Rs(x, y), Gs(x, y), Bs(x, y)) be the signal values of a source image (where x and y are the coordinate values of an image). Then, a difference E between the grid point values and signal values is calculated by:

$$E=\sqrt{((Rg-Rs(x,y))^2+(Gg-Gs(x,y))^2+(Bg-Bs(x,y))^2)} \tag{45}$$

If the difference E of the signal values is equal to or smaller than a threshold value L, which is determined in advance, it is determined that the signal values neighbor a given grid point. If a pixel that satisfies E≦L is extracted from the source image, the data comparison unit 202 reads out signal values (Rd(x, y), Gd(x, y), Bd(x, y)) of a destination image corresponding to the coordinate position (x, y) of that pixel, and the signal values of the source and destination images are converted into signal values of hue H, saturation S, and luminance Y by:

$$Ys(x,y)=0.3 \times Rs(x,y)+0.59 \times Gs(x,y)+0.11 \times Bs(x,y) \tag{46}$$

$$Us(x,y)=(Bs(x,y)-Ys(x,y)) \times 0.564 \tag{47}$$

$$Vs(x,y)=(Rs(x,y)-Ys(x,y)) \times 0.713 \tag{48}$$

$$Hs(x,y)=\mathrm{Tan}-1(Us(x,y)/Vs(x,y)) \tag{49}$$

$$Ss(x,y)=\sqrt{Us(x,y)^2+Vs(x,y)^2} \tag{50}$$

$$Yd(x,y)=0.3 \times Rd(x,y)+0.59 \times Gd(x,y)+0.11 \times Bd(x,y) \tag{51}$$

$$Ud(x,y)=(Bd(x,y)-Yd(x,y)) \times 0.564 \tag{52}$$

$$Vd(x,y)=(Rd(x,y)-Yd(x,y)) \times 0.713 \tag{53}$$

$$Hd(x,y)=\mathrm{Tan}-1(Ud(x,y)/Vd(x,y)) \tag{54}$$

$$Sd(x,y)=\sqrt{Ud(x,y)^2+Vd(x,y)^2} \tag{55}$$

If saturation Ss(x, y) of the signal values of the source image is equal to or smaller than a threshold value T (Ss≦T), it is also compared with saturation Sd(x, y) of the signal values of the destination image. If Ss(x, y)≧Sd(x, y), dY, dU, and because tinting has not occurred, dV are calculated by:

$$dY=Ys(x,y)-Yd(x,y) \tag{56}$$

$$dU=Us(x,y)-Ud(x,y) \tag{57}$$

$$dV=Vs(x,y)-Vd(x,y) \tag{58}$$

On the other hand, if Ss(x, y)<Sd(x, y), because tinting has occurred, the achromatic color correction processing unit 203 calculates dY, dU, and dV using:

$$\alpha=Ss(x,y)/Sd(x,y) \tag{59}$$

$$Ud'(x,y)=Sd(x,y) \times \alpha \times \mathrm{Sin}(Hd(x,y)) \tag{60}$$

$$Vd'(x,y)=Sd(x,y) \times \alpha \times \mathrm{Cos}(Hd(x,y)) \tag{61}$$

$$dY=Ys(x,y)-Yd(x,y) \tag{62}$$

$$dU=Us(x,y)-Ud'(x,y) \tag{63}$$

$$dV=Vs(x,y)-Vd'(x,y) \tag{64}$$

Average values dYave, dUave, and dVave of dY, dU, and dV of the entire source image at the grid point values (Rg, Gg, Bg) are calculated. If the source image does not include any values in the neighborhood of a grid point (E>L), dYave=dUave=dVave=0.

The average values dYave, dUave, and dVave are sent to the table data generation unit 204, which calculates grid point storage values (Yt, Ut, Vt) corresponding to the grid point values (Rg, Gg, Bg) of a customized 3D look-up table by:

$$Yg=0.3\times Rg+0.59\times Gg+0.11\times Bg \tag{65}$$

$$Ug=(Bg-Yg)\times 0.564 \tag{66}$$

$$Vg=(Rg-Yg)\times 0.713 \tag{67}$$

$$Yt=Yg-dYave \tag{68}$$

$$Ut=Ug-dUave \tag{69}$$

$$Vt=Vg-dVave \tag{70}$$

By repeating the above process for all the grid points, a 3D look-up table is generated. In addition, in this modification, it is determined whether or not image data is achromatic by comparing a source image Ss with a threshold T. It is possible to set up a level of image data on which an achromatic color correction process is performed, by varying the value of threshold T.

As described in modification 1, when R, G, and B signals are converted into Y, U, and V signals using the 3D look-up table, matrix operations required to convert R, G, and B signals into Y, U, and V signals can be omitted upon recording image data in a JPEG format. Hence, the arithmetic processing time can be shortened, and the arithmetic circuit scale can be reduced.

Modification 2 of First Embodiment Modification 2 of the first embodiment will be described below.

The following explanation will be given using the same block diagrams as those in the first embodiment.

In this embodiment, N of the N-dimensional look-up table is 3 for the sake of simplicity. Also, the first embodiment has explained generation of the 3D look-up table that converts R, G, and B signals into R, G, and B signals, but this embodiment will explain generation of a 3D look-up table that converts R, G, and B signals into Y, U, and V signals. In modification 1, the source and destination images belong to an identical color space. However, in this modification, a case will be described below wherein the source and destination images belong to different color spaces (e.g., the source image is expressed R, G, and B signals, and the destination image is expressed by Y, U, and V signals). A description of the same parts as those in the first embodiment will be omitted.

FIG. 2 is a block diagram showing the internal arrangement of the 3D look-up table generation unit 102. The data detection unit 201 calculates signal values in the neighborhood of grid point values (Rg, Gg, Bg). Let (Rs(x, y), Gs(x, y), Bs(x, y)) be the signal values of a source image (where x and y are the coordinate values of an image). Then, a difference E between the grid point values and signal values is calculated by:

$$E=\sqrt{((Rg-Rs(x,y))^2+(Gg-Gs(x,y))^2+(Bg-Bs(x,y))^2)} \tag{71}$$

If the difference E of the signal values is equal to or smaller than a threshold value L, which is determined in advance, it is determined that the signal values neighbor a given grid point. If a pixel that satisfies E≦L is extracted from the source image, the data comparison unit 202 reads out signal values (Yd(x, y), Ud(x, y), Vd(x, y)) of a destination image corresponding to the coordinate position (x, y) of that pixel, and the signal values of the source and destination images are converted into signal values of hue H, saturation S, and luminance Y by:

$$Ys(x,y)=0.3\times Rs(x,y)+0.59\times Gs(x,y)+0.11\times Bs(x,y) \tag{72}$$

$$Us(x,y)=(Bs(x,y)-Ys(x,y))\times 0.564 \tag{73}$$

$$Vs(x,y)=(Rs(x,y)-Ys(x,y))\times 0.713 \tag{74}$$

$$Hs(x,y)=\text{Tan}-1(Us(x,y)/Vs(x,y)) \tag{75}$$

$$Ss(x,y)=\sqrt{Us(x,y)^2+Vs(x,y)^2} \tag{76}$$

$$Hd(x,y)=\text{Tan}-1(Ud(x,y)/Vd(x,y)) \tag{77}$$

$$Sd(x,y)=\sqrt{Ud(x,y)^2+Vd(x,y)^2} \tag{78}$$

If saturation Ss(x, y) of the signal values of the source image is equal to or smaller than a threshold value T (Ss≦T), it is also compared with saturation Sd(x, y) of the signal values of the destination image. If Ss(x, y)≧Sd(x, y), dY, dU, and because tinting has not occurred, dV are calculated by:

$$dY=Ys(x,y)-Yd(x,y) \tag{79}$$

$$dU=Us(x,y)-Ud(x,y) \tag{80}$$

$$dV=Vs(x,y)-Vd(x,y) \tag{81}$$

On the other hand, if Ss(x, y)<Sd(x, y), because tinting has occurred, the achromatic color correction processing unit 203 calculates dY, dU, and dV using:

$$\alpha=Ss(x,y)/Sd(x,y) \tag{82}$$

$$Ud'(x,y)=Sd(x,y)\times\alpha\times\text{Sin}(Hd(x,y)) \tag{83}$$

$$Vd'(x,y)=Sd(x,y)\times\alpha\times\text{Cos}(Hd(x,y)) \tag{84}$$

$$dY=Ys(x,y)-Yd(x,y) \tag{85}$$

$$dU=Us(x,y)-Ud'(x,y) \tag{86}$$

$$dV=Vs(x,y)-Vd'(x,y) \tag{87}$$

Average values dYave, dUave, and dVave of dY, dU, and dV of the entire source image at the grid point values (Rg, Gg, Bg) are calculated. If the source image does not include any values in the neighborhood of a grid point (E>L), dYave=dUave=dVave=0.

The average values dYave, dUave, and dVave are sent to the table data generation unit 204, which calculates grid point storage values (Yt, Ut, Vt) corresponding to the grid point values (Rg, Gg, Bg) of a customized 3D look-up table by:

$$Yg=0.3\times Rg+0.59\times Gg+0.11\times Bg \tag{88}$$

$$Ug=(Bg-Yg)\times 0.564 \tag{89}$$

$$Vg=(Rg-Yg)\times 0.713 \tag{90}$$

$$Yt=Yg-dYave \tag{91}$$

$$Ut=Ug-dUave \tag{92}$$

$$Vt=Vg-dVave \tag{93}$$

By repeating the above process for all the grid points, a 3D look-up table is generated.

Modification 2 has demonstrated that tinting correction of achromatic colors is possible even when the source and destination images belong to different color spaces. In modification 2, even when the source image is expressed R, G, and B signals, and the destination image is expressed by Y, U, and V signals, R, G, and B signals are converted into Y, U, and V signals using a 3D look-up table as in modification 1. Hence, matrix operations required to convert R, G, and B signals into Y, U, and V signals can be omitted upon recording image data in a JPEG format, thus shortening the arithmetic processing time, and reducing the arithmetic circuit scale.

The aforementioned look-up table generation methods according to the first embodiment of the present invention and its modification can be implemented on, but not limited to a digital camera or PC.

Second Embodiment

In the first embodiment, an achromatic color correction table is generated in the 3D look-up table generation unit 102 in FIG. 1. On the other hand, in the second embodiment, an achromatic color table correction is performed after a basic look-up table has been generated in the 3D look-up table generation unit 502 as shown in FIG. 5.

Figure 5:
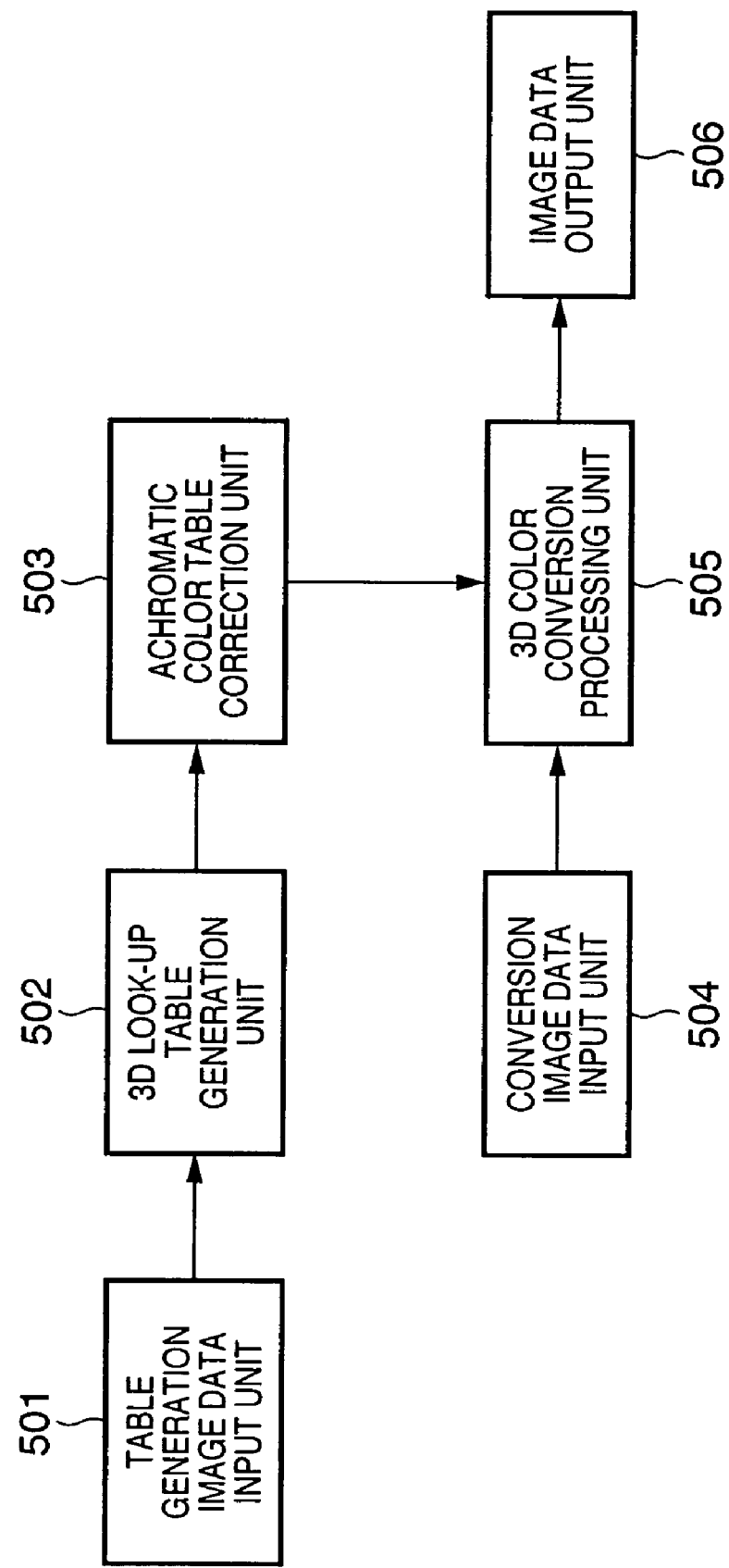
FIG. 5 is a block diagram showing a color conversion processing system according to the second embodiment.
Figure 8:
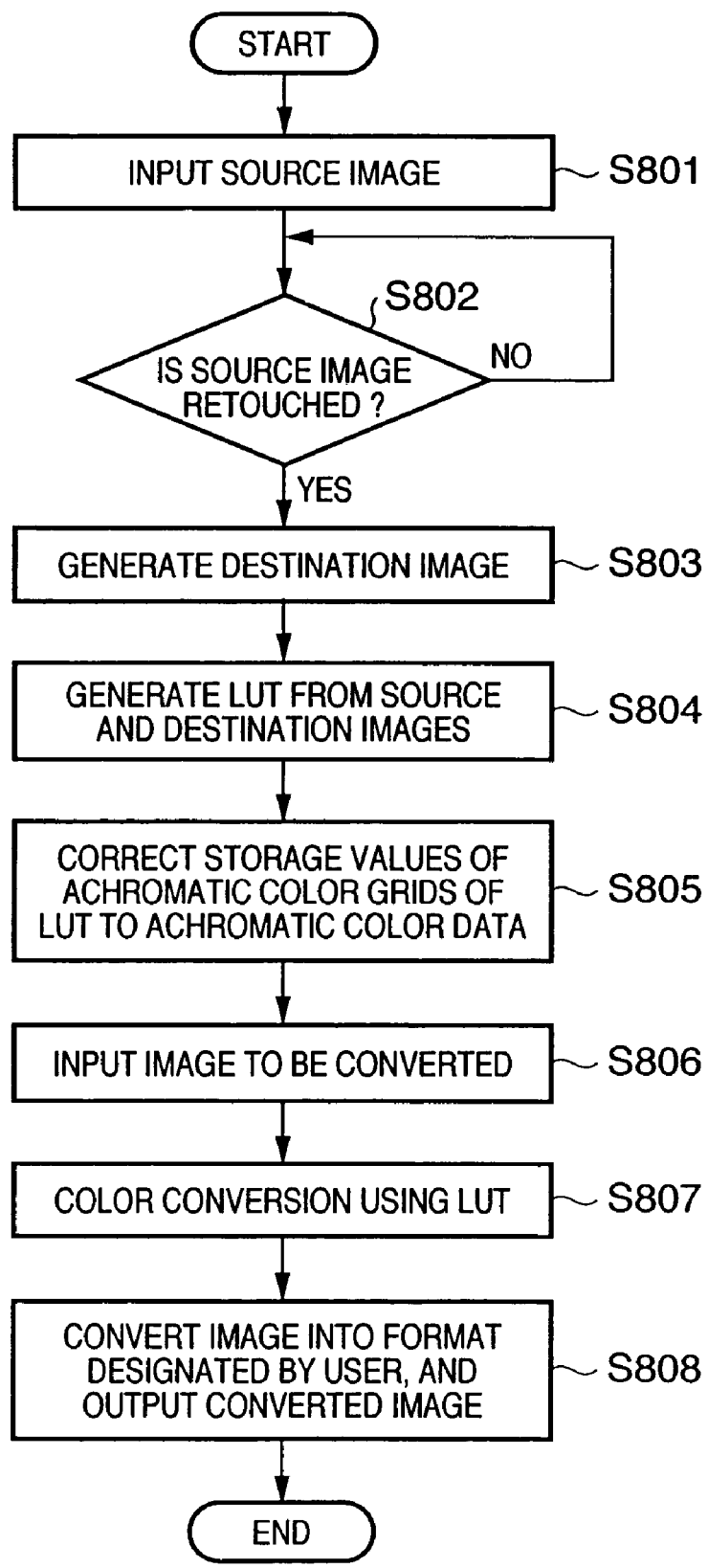
FIG. 8 is a flow chart of a color conversion table using a 3D look-up table according to the second embodiment.

FIG. 5 is a simple block diagram of a color conversion system using an N-dimensional look-up table generation process according to the present invention. An N-dimensional look-up table generation method according to this embodiment and a color conversion process using an N-dimensional look-up table generated by that method will be described below using the block diagram of FIG. 5, and the flow chart of FIG. 8. In this embodiment, N of the N-dimensional look-up table is 3 for the sake of simplicity.

Referring to FIG. 5, a table generation image input unit 501 is a processing unit for inputting image data which is used as a basis upon generation of a three-dimensional (3D) look-up table. The user inputs or designates a source (original) image as image data used as a conversion source (S801), and locally or entirely applies a retouch process to the colors of the source image according to his or her favor (S802). Note that the source image is imaged by an imaging apparatus, and a destination (target) image is obtained by retouching the source image. As a result, a destination image is generated (S803). The source and destination images are sent to a 3D look-up table generation unit 502, which generates a 3D look-up table on the basis of the source and destination images (S804). After the 3D look-up table is generated, an achromatic color table data correction unit 503 corrects this 3D look-up table data so that table data at achromatic color grids become achromatic color data (S805). The flow of the 3D look-up table generation process has been briefly explained. The flow of a color conversion process that implements color conversion using this 3D look-up table will be explained below. Image data to be converted using the 3D look-up table is input to a conversion image data input unit 504 (S806). This input unit 504 reads out signal values on the basis of the format of image data and sends them to a 3D color conversion processing unit 505. The 3D color conversion processing unit 505 executes a color conversion process using the 3D look-up table generated by the 3D look-up table generation unit 502 (S807). The signal values of the image that has undergone the color conversion process undergo format conversion on the basis of an image data format designated by the user in an image data output unit 506, and the converted signal values are output (S808). The flow of the process has been briefly explained. The individual processing units will be described in more detail below.

Figure 6:
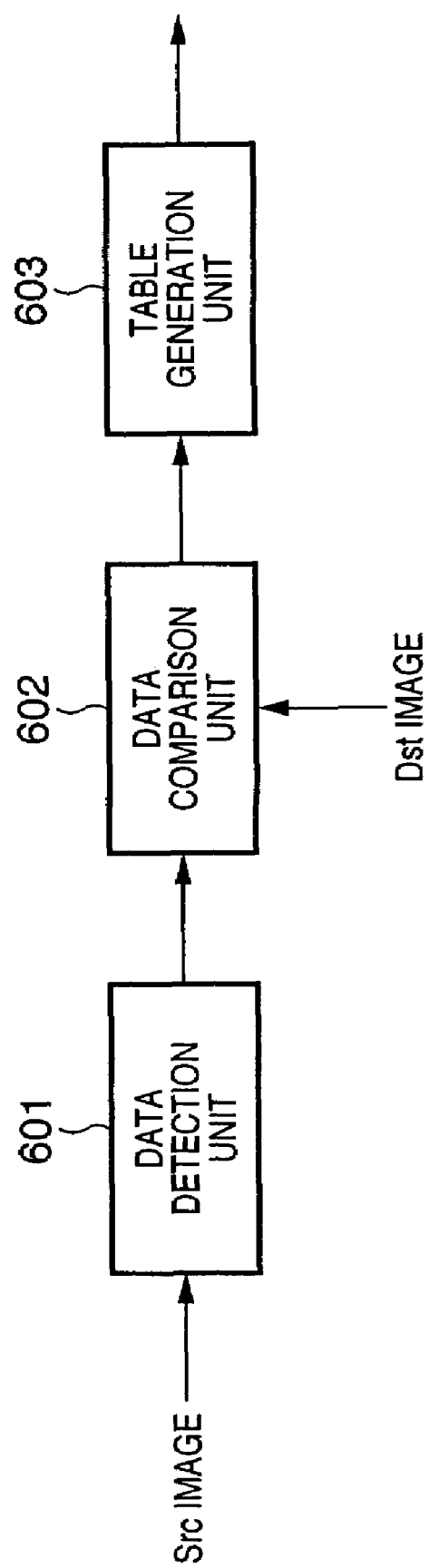
FIG. 6 is a block diagram of a three-dimensional (3D) look-up table generation unit in the second embodiment.
Figure 9:
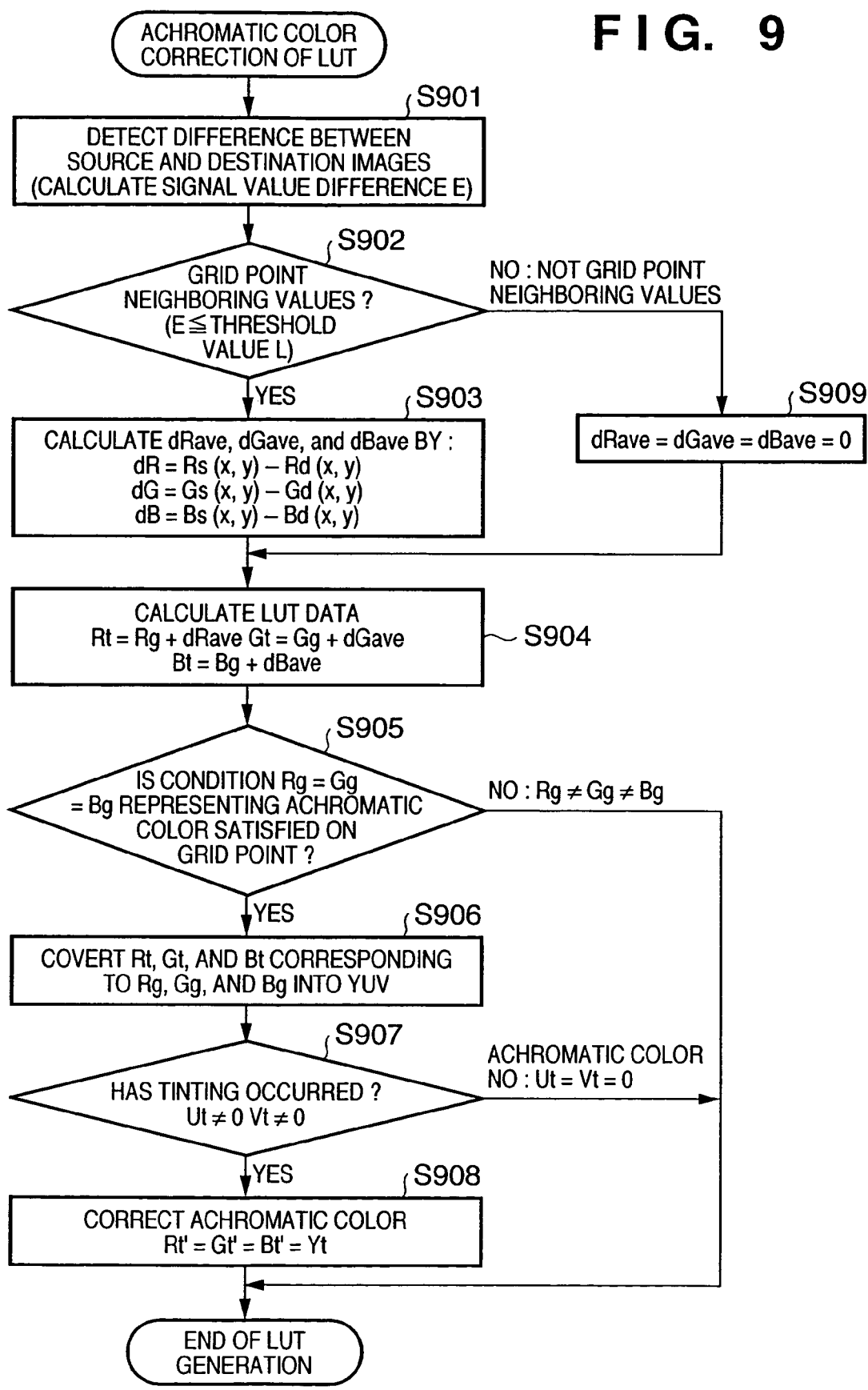
FIG. 9 is a flow chart of an achromatic color correction process of a look-up table generation unit according to the second embodiment.

FIG. 6 is a block diagram showing the internal arrangement of the 3D look-up table generation unit 502 shown in FIG. 5, and the flow of the process will be described below using the flow chart of FIG. 9.

In this embodiment, a 3D look-up table having 729 (=9×9×9) grid points is defined by setting a grid point (signal value) interval=32 steps, and I-, J-, and K-th grid point values of the 3D look-up table in the R, G, and B directions are respectively given by:

$$Rg = 32 \times I \tag{2-1}$$

$$Gg = 32 \times J \tag{2-2}$$

$$Bg = 32 \times K \tag{2-3}$$

Also, grid point storage values corresponding to these grid point values are respectively expressed by:

$$Rt = 3DTableR(I,J,K) \tag{2-4}$$

$$Gt = 3DTableG(I,J,K) \tag{2-5}$$

$$Bt = 3DTableB(I,J,K) \tag{2-6}$$

(for I=0 to 8, J=0 to 8, and K=0 to 8)

For example, if I=1, J=2, and K=3, grid point values are (32×1, 32×2, 32×3)=(32, 64, 96), and the grid point storage values are (3DTableR(1, 2, 3), 3DTableG(1, 2, 3), 3DTableB (1, 2, 3)). This means that data conversion using this 3D look-up table converts input signal values (32, 64, 96) into signal values (3DTableR(1, 2, 3), 3DTableG(1, 2, 3), 3DTableB(1, 2, 3)). When a 3D look-up table is set to obtain Rt=Rg, Gt=Gg, and Bt=Bg at all grid points, a 3D look-up table which can output the same values as input values is set.

FIG. 6 is a block diagram showing the internal arrangement of the 3D look-up table generation unit 502 in FIG. 5. A data detection unit 601 calculates signal values in the neighborhood of grid point values (Rg, Gg, Bg). Let (Rs(x, y), Gs(x, y), Bs(x, y)) be the signal values of a source image (where x and y are the coordinate values of an image). Then, a difference E between the grid point values and signal values is calculated (S901) by:

$$E = \sqrt{((Rg - Rs(x,y))^2 + (Gg - Gs(x,y))^2 + (Bg - Bs(x,y))^2)} \tag{2-7}$$

It is compared if the signal value difference E is equal to or smaller than a threshold value L (S902). If the difference E of the signal values is equal to or smaller than the threshold value L, which is determined in advance, it is determined that the signal values neighbor a given grid point. The threshold value L used in this case is determined by a signal value difference which can be perceived as a different color. Hence, it is desirable to set different values for respective colors. However, in the description of this embodiment, the same value L is used for all colors for the sake of simplicity. When a pixel which has values in the neighborhood of a grid point, i.e., meets E≦L, is extracted from the source image, a data comparison unit 602 reads out signal values (Rd(x, y), Gd(x, y), Bd(x, y)) of a destination image corresponding to the coordinate position (x, y) of that pixel, and dR, dG, and dB are calculated using the signal values of the source and destination images.

$$dR = Rs(x,y) - Rd(x,y) \tag{2-8}$$

$$dG = Gs(x,y) - Gd(x,y) \tag{2-9}$$

$$dB = Bs(x,y) - Bd(x,y) \tag{2-10}$$

Average values dRave, dGave, and dBave of dR, dG, and dB of the entire source image at the grid point values (Rg, Gg, Bg) are calculated (S903). If the source image does not include any values in the neighborhood of a grid point (E>L), dRave=dGave= dBave=0 (S909).

The values dRave, dGave, and dBave calculated by the above method are sent to a table data generation unit 603, which calculates grid point storage values (Rt, Gt, Bt) corresponding to the grid point values (Rg, Gg, Bg) of a customized 3D look-up table (S904) by:

$$Rt=Rg-dRave \quad (2\text{-}11)$$

$$Gt=Gg-dGave \quad (2\text{-}12)$$

$$Bt=Bg-dBave \quad (2\text{-}13)$$

The aforementioned process is repeated for all the 729 grid points of the 3D look-up table to calculate corresponding grid point storage values (3D look-up table data).

Next, the calculated 3D look-up table data are sent to the achromatic color table data correction unit 503 in FIG. 5. The unit 503 checks grid point storage values (Rt, Gt, Bt) corresponding to grid point values (Rg, Gg, Bg) of the 3D look-up table which satisfy a condition Rg=Gg=Bg that means an achromatic color (S905). The grid point storage values (Rt, Gt, Bt) are converted into Y, U, and V signals (S906) by:

$$Yt=0.3 \times Rt+0.59 \times Gt+0.11 \times Bt \quad (2\text{-}14)$$

$$Ut=(Bt-Yt) \times 0.564 \quad (2\text{-}15)$$

$$Vt=(Rt-Yt) \times 0.713 \quad (2\text{-}16)$$

It is then checked if Ut=Vt=0 does not hold, i.e., if tinting has occurred. If Ut=Vt=0, since they mean an achromatic color, the grid point storage values (Rt, Gt, Bt) of the 3D look-up table are used without being corrected. However, if Ut or Vt is not zero, since tinting has occurred, Rt', Gt', and Bt' corresponding to each pixel are calculated by:

$$Rt'=Yt \quad (2\text{-}17)$$

$$Gt'=Yt \quad (2\text{-}18)$$

$$Bt'=Yt \quad (2\text{-}19)$$

Then, the values (Rt', Gt', Bt') are used as new grid point storage values of the 3D look-up table (S908).

By repeating the processes from S905 to S908 for all grid points that satisfy Rg=Gg=Bg representing achromatic colors, the 3D look-up table can undergo achromatic color correction.

The 3D color conversion processing unit 505 will be described below. Values I, J, and K representing an index of a grid point are calculated from RGB signal values R, G, and B of an image sent from the conversion image input unit 504 (note that digits after the decimal point of I, J, and K are dropped):

$$I=R/32 \quad (2\text{-}20)$$

$$J=G/32 \quad (2\text{-}21)$$

$$K=B/32 \quad (2\text{-}22)$$

Furthermore, values Rf, Gf, and Bf representing distances between the RGB signal values R, G, and B of the image and grid point values are calculated by:

$$Rf=R-I \times 32 \quad (2\text{-}23)$$

$$Gf=G-J \times 32 \quad (2\text{-}24)$$

$$Bf=B-K \times 32 \quad (2\text{-}25)$$

Using the above values, converted values Ro, Go, and Bo obtained by converting the RGB signal values R, G, and B of the image using the 3D look-up table and cubic interpolation calculations are calculated by:

$$\begin{aligned}Ro=&(3DtableR(I,J,K) \times (32-Rf) \times (32-Gf) \times (32-Bf) \\&+3DtableR(I+1,J,K) \times (Rf) \times (32-Gf) \times (32-Bf) \\&+3DtableR(I,J+1,K) \times (32-Rf) \times (Gf) \times (32-Bf) \\&+3DtableR(I,J,K+1) \times (32-Rf) \times (32-Gf) \times (Bf) \\&+3DtableR(I+1, J+1,K) \times (Rf) \times (Gf) \times (32-Bf) \\&+3DtableR(I+1,J,K+1) \times (Rf) \times (32-Gf) \times (Bf) \\&+3DtableR(I,J+1,K+1) \times (32-Rf) \times (Gf) \times (Bf) \\&+3DtableR(I+1, J+1,K+1) \times (Rf) \times (Gf) \times (Bf))/(32 \times 32 \times 32) \end{aligned} \quad (2\text{-}26)$$

$$\begin{aligned}Go=&(3DtableG(I,J,K) \times (32-Rf) \times (32-Gf) \times (32-Bf) \\&+3DtableG(I+1,J,K) \times (Rf) \times (32-Gf) \times (32-Bf) \\&+3DtableG(I,J+1,K) \times (32-Rf) \times (Gf) \times (32-Bf) \\&+3DtableG(I,J,K+1) \times (32-Rf) \times (32-Gf) \times (Bf) \\&+3DtableG(I+1, J+1,K) \times (Rf) \times (Gf) \times (32-Bf) \\&+3DtableG(I+1,J,K+1) \times (Rf) \times (32-Gf) \times (Bf) \\&+3DtableG(I,J+1,K+1) \times (32-Rf) \times (Gf) \times (Bf) \\&+3DtableG(I+1, J+1,K+1) \times (Rf) \times (Gf) \times (Bf))/(32 \times 32 \times 32) \end{aligned} \quad (2\text{-}27)$$

$$\begin{aligned}Bo=&(3DtableB(I,J,K) \times (32-Rf) \times (32-Gf) \times (32-Bf) \\&+3DtableB(I+1,J,K) \times (Rf) \times (32-Gf) \times (32-Bf) \\&+3DtableB(I,J+1,K) \times (32-Rf) \times (Gf) \times (32-Bf) \\&+3DtableB(I,J,K+1) \times (32-Rf) \times (32-Gf) \times (Bf) \\&+3DtableB(I+1, J+1,K) \times (Rf) \times (Gf) \times (32-Bf) \\&+3DtableB(I+1,J,K+1) \times (Rf) \times (32-Gf) \times (Bf) \\&+3DtableB(I,J+1,K+1) \times (32-Rf) \times (Gf) \times (Bf) \\&+3DtableB(I+1, J+1,K+1) \times (Rf) \times (Gf) \times (Bf))/(32 \times 32 \times 32) \end{aligned} \quad (2\text{-}28)$$

With the above conversion, the R, G, and B signal values of the image input to the conversion image data input unit 504 are converted into Ro, Go, and Bo for respective pixels using the 3D look-up table which is generated by the unit 502 and undergoes achromatic color correction by the unit 503, and interpolation calculations, and the converted values are sent to the image data output unit 506.

In this embodiment, R, G, and B signals are used as source image data (source image signals) and destination image data (destination image signals). However, the present invention is not limited to such specific signals, but any other signals such as YUV signals, CMY signals, CMYG signals, and the like may be used. In this embodiment, saturation values are converted onto the YUV space to check an achromatic color based on the U and V values. However, the saturation values may be converted onto any other color spaces as long as they allow determination of achromatic colors.

The source and destination images may belong to different color spaces (e.g., the source image is expressed by R, G, and B signals, and the destination image is expressed by Y, U, and V signals). In this embodiment, the 3D look-up table that converts R, G, and B signals into R, G, and B signals is used under the condition of a format that records R, G, and B signals in a bitmap format or Tiff format as an image signal. Hence, the present invention is not limited to conversion from R, G, and B signals into R, G, and B signals, and a conversion table that converts from R, G, and B signals into Y, U, and V signals, a conversion table that converts from R, G, and B signals into L*, a*, and b* signals, and the like may be set.

Modification of Second Embodiment

A modification of this embodiment will be described below.

Figure 7:
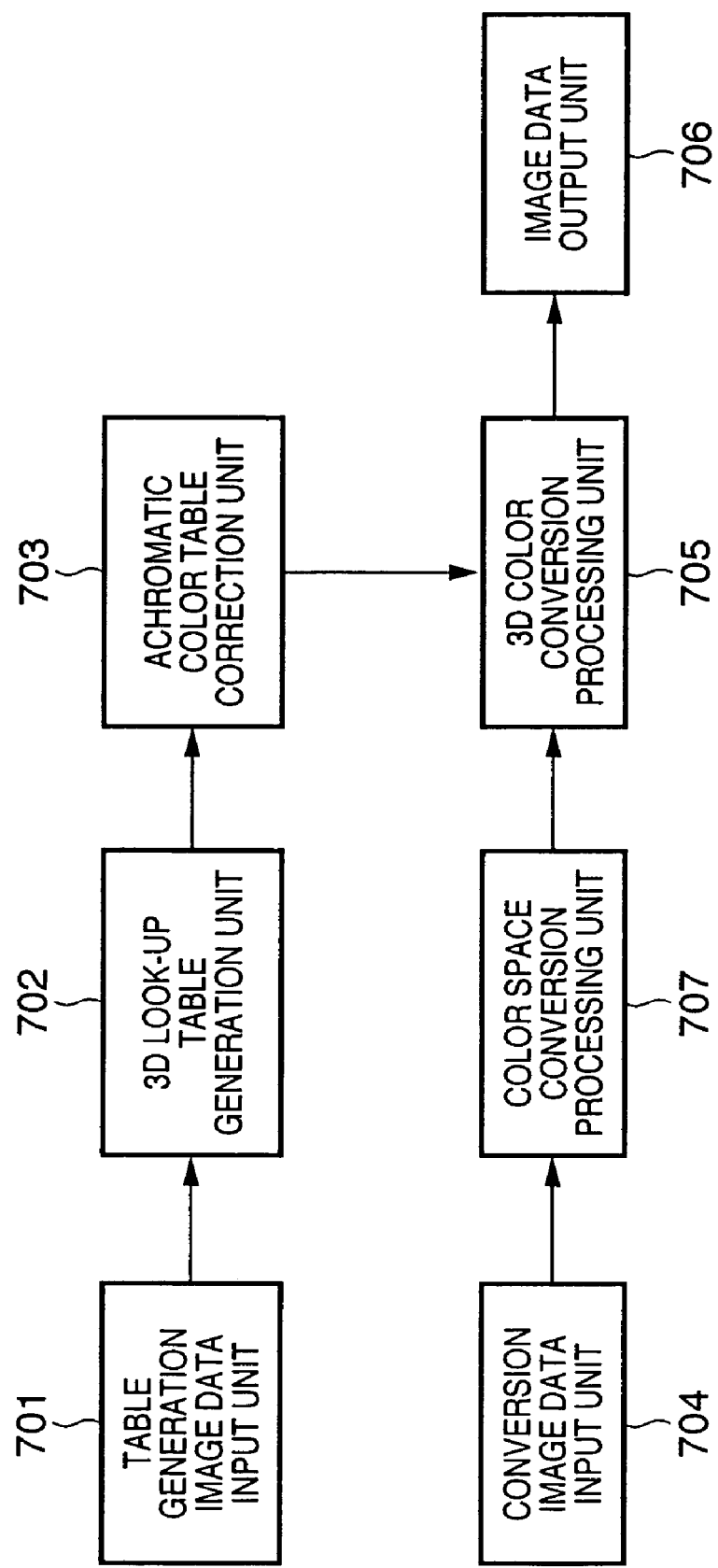
FIG. 7 is a block diagram showing a color conversion processing system according to a modification of the second embodiment.

FIG. 7 is a simple block diagram of a color conversion system using an N-dimensional look-up table generation method according to modification 1 of this embodiment. An N-dimensional look-up table generation method according to this embodiment and a color conversion process using an N-dimensional look-up table generated by that method will be described below using the block diagram of FIG. 7. In this embodiment, N of the N-dimensional look-up table is 3 for the sake of simplicity. The second embodiment has explained generation of the 3D look-up table for converting R, G, and B signals into R, G, and B signals. However, this modification will explain a case wherein 3D look-up table data for converting R, G, and B signals into Y, U, and V signals are to be generated. A description of the same parts as those in the second embodiment will be omitted.

FIG. 6 is a block diagram showing the internal arrangement of a 3D look-up table generation unit 702 shown in FIG. 7. A data detection unit 601 calculates signal values in the neighborhood of grid point values (Rg, Gg, Bg). Let (Rs(x, y), Gs(x, y), Bs(x, y)) be the signal values of a source image (where x and y are the coordinate values of an image). Then, a difference E between the grid point values and signal values is calculated by:

$$E=\sqrt{((Rg-Rs(x,y))^2+(Gg-Gs(x,y))^2+(Bg-Bs(x,y))^2)} \quad (2\text{-}29)$$

If the difference E of the signal values is equal to or smaller than a threshold value L, which is determined in advance, it is determined that the signal values neighbor a given grid point. If a pixel that satisfies $E \leq L$ is extracted from the source image, a data comparison unit 602 reads out signal values (Rd(x, y), Gd(x, y), Bd(x, y)) of a destination image corresponding to the coordinate position (x, y) of that pixel, and dR, dG, and dB are calculated using the signal values of the source and destination images.

$$dR=Rs(x,y)-Rd(x,y) \quad (2\text{-}30)$$

$$dG=Gs(x,y)-Gd(x,y) \quad (2\text{-}31)$$

$$dB=Bs(x,y)-Bd(x,y) \quad (2\text{-}32)$$

Average values dRave, dGave, and dBave of dR, dG, and dB of the entire source image at the grid point values (Rg, Gg, Bg) are calculated. If the source image does not include any values in the neighborhood of a grid point (E>L), dRave=dGave=dBave=0.

The values dRave, dGave, and dBave calculated by the above method are sent to a table data generation unit 603, which calculates RGB signals Rt, Gt, and Bt after color conversion corresponding to the grid point values (Rg, Gg, Bg) of a customized 3D look-up table (S904) by:

$$Rt=Rg-dR\text{ave} \quad (2\text{-}33)$$

$$Gt=Gg-dG\text{ave} \quad (2\text{-}34)$$

$$Bt=Bg-dB\text{ave} \quad (2\text{-}35)$$

Rt, Gt, and Bt are converted into Y, U, and V signals, that is, grid point storage values (Yt, Ut, Vt) by:

$$Yt=0.3 \times Rt+0.59 \times Gt+0.11 \times Bt \quad (2\text{-}36)$$

$$Ut=(Bt-Yt) \times 0.564 \quad (2\text{-}37)$$

$$Vt=(Rt-Yt) \times 0.713 \quad (2\text{-}38)$$

The aforementioned process is repeated for all the 729 grid points of the 3D look-up table to calculate corresponding grid point storage values (3D look-up table data). The calculated 3D look-up table data are sent to an achromatic color table correction unit 703 in FIG. 7. The unit 703 checks grid point storage values (Yt, Ut, Vt) corresponding to grid point values (Rg, Gg, Bg) of the 3D look-up table, which satisfy a condition Rg=Gg=Bg. If Ut=Vt=0, since they mean an achromatic color, the grid point storage values (Yt, Ut, Vt) of the 3D look-up table are used without being corrected. However, if Ut or Vt is not zero, since tinting has occurred, correction is made by:

$$Ut'=0 \quad (2\text{-}39)$$

$$Vt'=0 \quad (2\text{-}40)$$

Then, values (Yt, Ut', Vt') are used as the grid point storage values corresponding to the grid point values (Rg, Gg, Bg).

By repeating the above processes for all grid points that satisfy Rg=Gg=Bg, the 3D look-up table can undergo achromatic color correction.

A color conversion process using the generated 3D look-up table will be explained below. Image data to be converted is input to a conversion image data input unit 704. This input unit 704 reads out signal values on the basis of the format of image data. In this modification, a JPEG format image will be exemplified as a format. Readout Y, U, and V signal data are converted into R, G, and B signal data by a color space conversion processing unit 707, and the R, G, and B signal data are sent to a 3D color conversion processing unit 705. The R, G, and B signal data undergo a color conversion process using the 3D look-up table output from the unit 703 in FIG. 7. The signal values of the image that has undergone the color conversion process undergo format conversion on the basis of the JPEG format in an image data output unit 706, and the converted signal values are output. The flow of the color conversion process has been explained.

The 3D color conversion processing unit 705 will be described below. Values I, J, and K representing an index of a grid point are calculated from RGB signal values R, G, and B of an image sent from the conversion image input unit 707 (note that digits after the decimal point of I, J, and K are dropped):

$$I=R/32 \quad (2\text{-}41)$$

$$J=G/32 \quad (2\text{-}42)$$

$$K=B/32 \quad (2\text{-}43)$$

Furthermore, values Rf, Gf, and Bf representing distances between the RGB signal values R, G, and B of the image and grid point values are calculated by:

$$Rf = R - I \times 32 \quad (2\text{-}44)$$

$$Gf = G - J \times 32 \quad (2\text{-}45)$$

$$Bf = B - K \times 32 \quad (2\text{-}46)$$

Using the above values, converted values Yo, Uo, and Vo obtained by converting the RGB signal values R, G, and B of the image using the 3D look-up table and cubic interpolation calculations are calculated by:

$$\begin{aligned}
Yo = &\, 3\text{Dtable}Y(I,J,K) \times (32-Rf) \times (32-Gf) \times (32-Bf) \\
&+ 3\text{Dtable}Y(I+1,J,K) \times (Rf) \times (32-Gf) \times (32-Bf) \\
&+ 3\text{Dtable}Y(I,J+1,K) \times (32-Rf) \times (Gf) \times (32-Bf) \\
&+ 3\text{Dtable}Y(I,J,K+1) \times (32-Rf) \times (32-Gf) \times (Bf) \\
&+ 3\text{Dtable}Y(I+1,J+1,K) \times (Rf) \times (Gf) \times (32-Bf) \\
&+ 3\text{Dtable}Y(I+1,J,K+1) \times (Rf) \times (32-Gf) \times (Bf) \\
&+ 3\text{Dtable}Y(I,J+1,K+1) \times (32-Rf) \times (Gf) \times (Bf) \\
&+ 3\text{Dtable}Y(I+1,J+1,K+1) \times (Rf) \times (Gf) \times (Bf))/(32 \times 32 \times 32) \quad (2\text{-}47)
\end{aligned}$$

$$\begin{aligned}
Uo = &\, 3\text{Dtable}U(I,J,K) \times (32-Rf) \times (32-Gf) \times (32-Bf) \\
&+ 3\text{Dtable}U(I+1,J,K) \times (Rf) \times (32-Gf) \times (32-Bf) \\
&+ 3\text{Dtable}U(I,J+1,K) \times (32-Rf) \times (Gf) \times (32-Bf) \\
&+ 3\text{Dtable}U(I,J,K+1) \times (32-Rf) \times (32-Gf) \times (Bf) \\
&+ 3\text{Dtable}U(I+1,J+1,K) \times (Rf) \times (Gf) \times (32-Bf) \\
&+ 3\text{Dtable}U(I+1,J,K+1) \times (Rf) \times (32-Gf) \times (Bf) \\
&+ 3\text{Dtable}U(I,J+1,K+1) \times (32-Rf) \times (Gf) \times (Bf) \\
&+ 3\text{Dtable}U(I+1,J+1,K+1) \times (Rf) \times (Gf) \times (Bf))/(32 \times 32 \times 32) \quad (2\text{-}48)
\end{aligned}$$

$$\begin{aligned}
Vo = &\, 3\text{Dtable}V(I,J,K) \times (32-Rf) \times (32-Gf) \times (32-Bf) \\
&+ 3\text{Dtable}V(I+1,J,K) \times (Rf) \times (32-Gf) \times (32-Bf) \\
&+ 3\text{Dtable}V(I,J+1,K) \times (32-Rf) \times (Gf) \times (32-Bf) \\
&+ 3\text{Dtable}V(I,J,K+1) \times (32-Rf) \times (32-Gf) \times (Bf) \\
&+ 3\text{Dtable}V(I+1,J+1,K) \times (Rf) \times (Gf) \times (32-Bf) \\
&+ 3\text{Dtable}V(I+1,J,K+1) \times (Rf) \times (32-Gf) \times (Bf) \\
&+ 3\text{Dtable}V(I,J+1,K+1) \times (32-Rf) \times (Gf) \times (Bf) \\
&+ 3\text{Dtable}V(I+1,J+1,K+1) \times (Rf) \times (Gf) \times (Bf))/(32 \times 32 \times 32) \quad (2\text{-}49)
\end{aligned}$$

With the above conversion, the R, G, and B signal values of the image input to the conversion image data input unit 707 are converted into Yo, Uo, and Vo for respective pixels using the 3D look-up table and interpolation calculations, and the converted values are sent to the image data output unit 706.

As described in this embodiment, when R, G, and B signals are converted into Y, U, and V signals using a 3D look-up table, matrix operations required to convert R, G, and B signals into Y, U, and V signals can be omitted upon recording image data in the JPEG format. Hence, the arithmetic processing time can be shortened, and the arithmetic circuit scale can be reduced.

Another Embodiment

The problems to be solved by the present invention can also be solved by combining the first and second embodiments.

For example, upon generating a look-up table used to make color conversion from R, G, and B signals into Y, U, and V signals, when the saturation value of the R, G, and B signals is equal to or smaller than a predetermined threshold value, a correction coefficient is calculated from the saturation values of the R, G, and B signals and Y, U, and V signals, so that the saturation value of the Y, U, and V signals becomes smaller than that of the R, G, and B signals. A correction signal is generated by multiplying the saturation value of the Y, U, and V signals by this correction coefficient, and a basic look-up table is generated using this correction signal. Grid point storage values stored at grid points which represent achromatic colors of this basic look-up table are converted into achromatic color data to correct the basic look-up table, thus generating a final conversion look-up table. A look-up table may be generated in such process. By doing this, it can be realized that a look-up table is first generated in which achromatic color is corrected to some extent by setting up a threshold T in accordance with the method of the first embodiment and then tinting of achromatic color in the look-up table generated by the method of the first embodiment is corrected precisely in accordance with the method of the second embodiment.

As described above, according to the present invention, since a look-up table is generated so that a signal representing an achromatic color is reliably converted into an achromatic color, discontinuity due to tinting of achromatic color images upon making color conversion using the look-up table can be avoided.

Others

When the aforementioned present invention is implemented on an imaging apparatus such as a digital camera or the like, an appropriate retouch process which is free from any occurrence of tinting of achromatic colors can be completed by the imaging apparatus alone.

Note that the present invention may be applied to a system constituted by a plurality of devices (e.g., a computer, interface, digital camera), or a standalone apparatus having their functions.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A look-up table generation method for generating a look-up table used to color-convert first image data into second image data, comprising the steps of:
   determining whether or not a saturation value of the first image data is not more than a predetermined threshold value;
   calculating, if it is determined that the saturation value of the first image data is not more than the threshold value, a correction coefficient from the saturation value of the first image data and a saturation value of the second image data so that the saturation value of the second image data becomes smaller than the saturation value of the first image data;
   generating third image data by multiplying the saturation value of the second image data by the correction coefficient; and
   generating a look-up table using the first and third image data.

2. The method according to claim 1, wherein the first image data is a source image as a basis, and the second image data is a destination image generated by applying a retouch process to the source image.

3. The method according to claim 1, wherein a color space of the first image data is different from a color space of the second image data.

4. The method according to claim 1, wherein the first image data is data on a first color space, the second image data is data on a second color space, the first image data is color-converted into the second image data, and the second image data is color-converted into the third image data on the second color space.

5. The method according to claim 1, wherein the look-up table has N dimensions.

6. The method according to claim 1, wherein the look-up table is a three-dimensional look-up table for RGB data.

7. The method according to claim 6, further comprising the steps of:
   calculating a correction coefficient on the basis of the color component signal values of the source and destination image data; and
   executing a correction process of the color component signal value of the destination image data by multiplying the color component signal value of the destination image data by the correction coefficient, and
   wherein in the step of generating the look-up table the look-up table is generated using the color component signal value of the source image data and the corrected color component signal value of the destination image data.

8. A look-up table generation method for generating a look-up table used to color-convert an arbitrary image using source image data and destination image data generated by applying a retouch process to the source image data, comprising the steps of:
   determining whether or not a color component signal value of the source image data is not more than a predetermined threshold value; and
   generating, when it is determined that the color component signal value of the source image data is not more than the threshold value, a look-up table so that a color component signal value of the destination image data becomes smaller than the color component signal value of the source image data.

9. The method according to claim 8, wherein a color space of the source image data is different from a color space of the destination image data.

10. The method according to claim 8, wherein the look-up table is an N-dimensional look-up table having N dimensions.

11. An imaging apparatus which executes a predetermined look-up table generation method, and executes an image process using a table generated by said table generation method,
   said method comprising the steps of:
   determining whether or not a saturation value of the first image data is not more than a predetermined threshold value;
   calculating, if it is determined that the saturation value of the first image data is not more than the threshold value, a correction coefficient from the saturation value of the first image data and a saturation value of the second image data so that the saturation value of the second image data becomes smaller than the saturation value of the first image data;

generating third image data by multiplying the saturation value of the second image data by the correction coefficient; and generating a look-up table using the first and third image data.

12. An imaging apparatus which executes a predetermined look-up table generation method, and executes an image process using a table generated by the table generation method, wherein said predetermined look-up table generation method is a look-up table generation method for generating a look-up table used to color-convert an arbitrary image using source image data and destination image data generated by applying a retouch process to the source image data, and said method comprising the steps of:

determining whether or not a color component signal value of the source image data is not more than a predetermined threshold value; and generating, when it is determined that the color component signal value of the source image data is not more than the threshold value, a look-up table so that a color component signal value of the destination image data becomes smaller than the color component signal value of the source image data.

13. A computer program embodied on a computer readable medium for making a computer execute a look-up table generation method for generating a look-up table used to color-convert first image data into second image data, comprising:

a code for implementing a determination step of determining whether or not a saturation value of the first image data is not more than a predetermined threshold value;

a code for implementing a correction coefficient calculation step of calculating, if it is determined in the determination step that the saturation value of the first image data is not more than the threshold value, a correction coefficient from the saturation value of the first image data and a saturation value of the second image data so that the saturation value of the second image data becomes smaller than the saturation value of the first image data;

a code for implementing a third image generation step of generating third image data by multiplying the saturation value of the second image data by the correction coefficient; and a code for implementing a table generation step of generating a look-up table using the first and third image data.

14. An imaging apparatus executing a computer program of claim 13.

15. A look-up table generation method for generating a look-up table used to color-convert first image data into second image data, comprising the steps of:

generating a basic look-up table used to color-convert the first image data into the second image data; and correcting the basic look-up table by converting a grid point storage value stored at each grid point representing an achromatic color of the basic look-up table into achromatic color data.

16. The method according to claim 15, wherein the basic look-up table is generated using source image data and destination image data generated by applying a retouch process to the source image data.

17. The method according to claim 16, wherein the source and destination image data belong to an identical color space.

18. The method according to claim 16, wherein the source and destination image data belong to different color spaces.

19. The method according to claim 15, wherein the first and second image data belong to an identical color space.

20. The method according to claim 15, wherein the first and second image data belong to different color spaces.

21. The method according to claim 15, wherein conversion into the achromatic color data is implemented by substituting the second image data by a corrected lightness signal.

22. The method according to claim 15, wherein the look-up table has N dimensions.

23. The method according to claim 15, wherein the look-up table is a three-dimensional look-up table for RGB data.

24. An imaging apparatus executing a computer program of claim 23.

25. An imaging apparatus that executes a predetermined look-up table generation method, said predetermined look-up table generation method comprising the steps of:

generating a basic look-up table used to color-convert first image data into second image data; and correcting the basic look-up table by converting a grid point storage value stored at each grid point representing an achromatic color of the basic look-up table into achromatic color data.

26. A computer program embodied on a computer readable medium for making a computer execute a look-up table generation method for generating a look-up table used to color-convert first image data into second image data, comprising:

a code for implementing a basic table generation step of generating a basic look-up table used to color-convert the first image data into the second image data; and a code for implementing a table correction step of correcting the basic look-up table by converting a grid point storage value stored at each grid point representing an achromatic color of the basic look-up table into achromatic color data.

27. A look-up table generation method for generating a look-up table used to color-convert first image data into second image data, comprising the step of:

determining whether or not a saturation value of the first image data is not more than a predetermined threshold value;

calculating, if it is determined that the saturation value of the first image data is not more than the threshold value, a correction coefficient from the saturation value of the first image data and a saturation value of the second image data so that the saturation value of the second image data becomes smaller than the saturation value of the first image data;

generating third image data by multiplying the saturation value of the second image data by the correction coefficient;

generating a basic look-up table using the first and third image data; and correcting the basic look-up table by converting a grid point storage value stored at each grid point representing an achromatic color of the basic look-up table into achromatic color data.

28. A look-up table generation method for generating a look-up table used to color-convert first image data into second image data, said method comprising the steps of:

determining whether or not the first image data include achromatic color data; and, generating the look-up table to determine a grid point storage value in the look-up table corresponding the first image data so that the second image data become achromatic color data, if it is determined that the first image data include achromatic color data.

* * * * *